United States Patent
Lev (10) Patent No.: US 7,796,406 B2
(45) Date of Patent: Sep. 14, 2010

(54) APPARATUS AND METHOD FOR HIGH EFFICIENCY ISOLATED POWER CONVERTER

(75) Inventor: Dubitsky Lev, Netania (IL)

(73) Assignee: Lumenis Ltd., Yokneam (IL)

( * ) Notice: Subject to any disclaimer, the term of this patent is extended or adjusted under 35 U.S.C. 154(b) by 580 days.

(21) Appl. No.: 11/882,171

(22) Filed: Jul. 31, 2007

(65) Prior Publication Data

US 2009/0034299 A1  Feb. 5, 2009

(51) Int. Cl.
*H02M 3/335* (2006.01)

(52) U.S. Cl. .................... 363/21.02; 363/15; 363/17; 363/56.02; 363/58; 363/132

(58) Field of Classification Search ............... 363/15, 363/16, 17, 21.02, 58, 132, 136, 56.02
See application file for complete search history.

(56) References Cited

U.S. PATENT DOCUMENTS

| | | | |
|---|---|---|---|
| 5,933,331 A | * | 8/1999 | Boldin et al. ............... 363/16 |
| 6,370,050 B1 | * | 4/2002 | Peng et al. .................. 363/98 |
| 2003/0035304 A1 | * | 2/2003 | Gu .............................. 363/17 |
| 2007/0070655 A1 | * | 3/2007 | Eguchi et al. ............... 363/17 |

* cited by examiner

*Primary Examiner*—Bao Q Vu
*Assistant Examiner*—Nguyen Tran
(74) *Attorney, Agent, or Firm*—Mintz Levin Cohn Ferris Glovsky and Popeo, P.C.

(57) ABSTRACT

A DC-DC converter apparatus comprising half or full bridge, two-stage resonant converter, which may include series resonant (inductor, capacitor) devices. An isolated transformer having primary and secondary winding supplies current to full-wave secondary stage-bridge through the use of primary winding resonant devices employing primary stage-bridge. The magnetizing of said devices employs zero-current, zero-voltage resonant-transition switching technology, which reduces switching losses at all switching frequencies to almost zero. The regulation of output voltage at all loads and input voltages achieved by the control of the switching frequency and the phase between signals for primary and secondary stages. The proper intermittent of the frequency and the phase allows achieving the value of efficiency up to 97%.

7 Claims, 9 Drawing Sheets

APPARATUS AND METHOD FOR HIGH EFFICIENCY ISOLATED POWER CONVERTER

FIELD OF THE INVENTION

This invention relates generally to a switching power converter and, more specifically, to a two-stage converter with transformer separation having improved zero voltage switching (ZVS) and zero current switching (ZCS) operation modes.

BACKGROUND OF THE INVENTION

The increased demand in the field of power conversion— size reduction and high-efficiency is difficult to meet with the present available power converters. Some features inherent in devices of relevant technology militate against achievement of the desired goals. Some converters are specifically designed to handle a wide range of output loads and variations of input voltage, resulting in less efficiency. Reducing the size of components (capacitors and magnetic component) related to high switching frequency and as results to concomitant high switching losses.

Common approach of ZVS and ZCS topology disclosed in the prior art is series resonant converter described in e.g. USOORE33866E, U.S. Pat. No. 6,178,099B1 that achieves nearly lossless soft switching using pulse width modulation and frequency super-resonant control of commutation in full or half bridge converter. Soft switching converters attempt to take advantage of the parasitic effect of components within the converter in order to reduce the voltage potentials across (and current flows through) the switches before effecting a switching operation. More specifically, soft switching converters adjust the switching timing in order to charge and to discharge the parasitic switch capacitances of the transistors through the use of current supplied by the magnetizing inductance of the winding of the transformer, thereby reducing the voltage across Off or Open transistors, and current flow through On or Closed transistors. During the time switching which transistors takes, the soft switching reduces the power losses during the switching operation, thereby enabling the converter to operate at high frequency, high efficiency and with reduced electromagnetic interference.

However, the operation with typical pulse width modulation or the variation of switching frequency is a deficient in full volume of line and maximal load alternation which leads to stresses on the switching devices which are similar to those of a hard switched converter.

At the series resonant converters disclosed in, e.g., U.S. Pat. No. 4,855,888 and EP 0503862B1 there is presented the topology of two-stage (full or half bridge) circuitry connected to input voltage. In the similar devices, such as those disclosed in U.S. Pat. Nos. 5,999,417 or 6,930,893 two stages are floating relatively to one another, where the output voltages are algebraic sum voltages of the output voltages of the two stages. The regulation of the output voltages is achieved by alteration of the phase between the two stages of the converter. However, the operation in full volume (from 0 to max) of loads and line variation leads to inevitable hard switching, e.g., excessive switching losses, excessive EMI and the like.

Quasi-resonant bidirectional converters were introduced in U.S. Pat. No. 4,663,699 and *Natural ZVS Medium-Power Bidirectional DC-DC Converters with Minimum Numbers of Devices*, Hui Li Fang Zheng Peng, J. S. Lawlee, IEEE, Vol. 39, No. 2, March/April 2003. Presented two stage active half-bridge topology featured ZVS in full volume of line and load variation. However, high current switching leads to high level conductive and switching losses, and causes the limitation to power, obstacles to decrease the cost, volume and EMI.

From this prior art other challenge is presented to minimize losses during the switch transition time of two stage active full bridge or half-bridge converter.

SUMMARY OF THE INVENTION

The present invention comprises two stages active full or half bridge switching circuits. The circuits comprise of four or two switches, respectively. Two stage connected by transformers where primary winding through series resonant tank applied to first stage, secondary winding to second stage. First stage is supplied by input voltages, second derives output voltage, DC or AC. The stages may be controlled by signals produced by a controller. The simultaneous changing of frequency and phase between signals attributed to first and second stage may feature the variation of output voltage from 0 to max at full alternation of line (input voltages, for example, rectified 50 Hz "Voltage Main") voltages and loads.

The present invention, in embodiments described hereinafter, may offer one, some, or all of the following advantages and features:

1. ZVS, ZCS in every combination of input voltages, output voltages and load from light (no-load) to max.
2. Load switching losses related to ZVS, ZCS.
3. Low conductive losses due to minimized value and sine shape of the current conducted through resonant tank and switching stages.
4. High efficiency due to low switching and conductive losses.
5. Means to distribute DC and AC voltage which are fully adjusted to the value of DC output voltages and to feature efficiency of up to 97%.

BRIEF DESCRIPTION OF THE DRAWINGS

For a more complete understanding of the present invention and its advantages, the description of the invention should be read in conjunction with the following drawings in which.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE INVENTION

The invention described herein after pertains to an electrically isolated DC-DC converter that may be used to deliver power of DC voltage or AC voltage (high frequency of up to, for example, 1 MHz yet the operational frequency high range may get higher as the technology of production of switching transistors improves) from a DC source such as a battery or rectifier utility. In such a converter, a transformer may be used to provide electrical isolation and a step-down or step-up in voltage level, according to its ratio, as may be required. Switching means (such as transistors, preferably MOSFET) and diodes, preferably of the fast recovery type may be used in conjunction with capacitors and inductors to induce non-DC current (i.e. AC or pulsating current) in the primary circuit to activate a transformer to create the required conversion. A control circuit may typically be included to provide the required driving signals to the transistor control terminals. The ability to provide a desired regulation performance is usually derived from the power circuit's topology and the manner in which its switching devices are controlled.

Figure 1A:
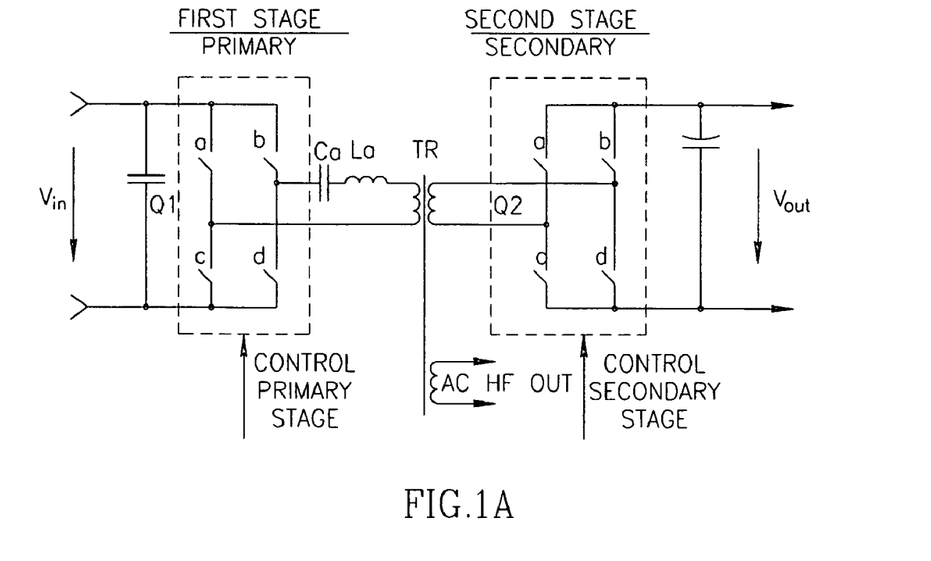
FIGS. 1A and 1B are schematic diagrams of four-way and two-way converter according to some embodiments of the present invention.
Figure 1B:
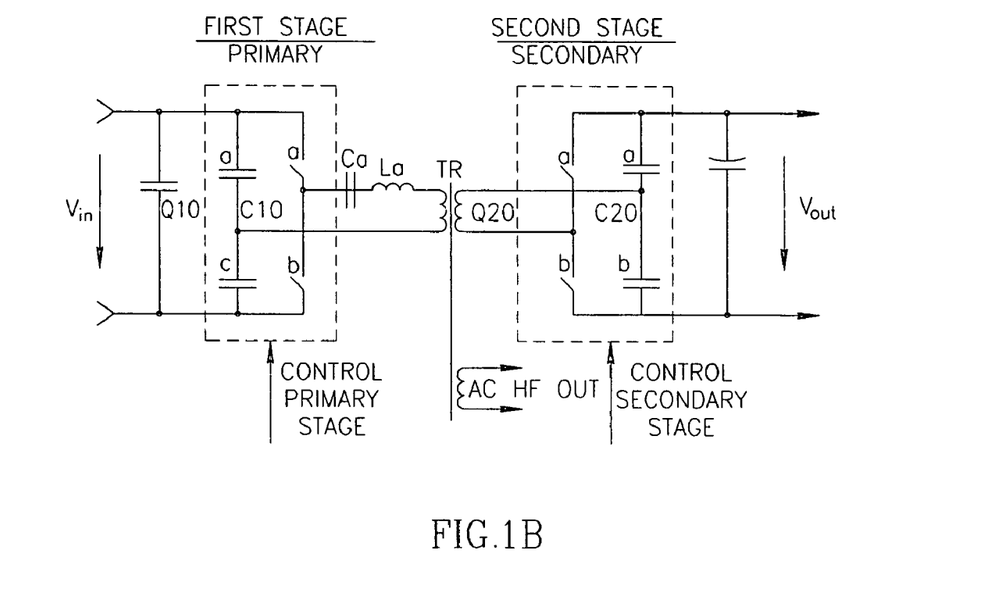

Attention is made now to FIGS. 1A and 1B which are schematic diagrams of four-way converter 2 and two-way converter 4 respectively according to some embodiments of the present invention. FIG. 1A depicts converter 2 with a two-stage structure coupled by a transformer TR, where the power flows through the first stage (primary stage) and then through the second stage (secondary stage). Both stages may be provided with regulation units. Additionally, the secondary stage may be electrically isolated from the primary stage by transformer TR which may also provide a step-down or step-up function of DC and AC output voltages. In converter 2 both primary and secondary stages of converter 2 may comprise quad switching topology with switching means Q1a-Q1d and Q2a-Q2d in the first and second stages respectively. Switching means Q1a-Q1d and Q2a-Q2d may be realized by any suitable controllable switch that will stand the switching conditions developing during the operation of converter 2, such as switching frequency, switching current and switching voltage. Switching means Q1a-Q1d and Q2a-Q2d may be controlled by a control unit (not shown). The purpose of the control unit may be to determine when each of the switching means will be turned ON or OFF, in each stage respectively. FIG. 1B depicts converter 4 with a two-stage structure coupled by a transformer TR, where the power flows through the first stage (primary stage) and then through the second stage (secondary stage). Similarly to converter 2 of FIG. 1A, the secondary stage may be electrically isolated from the primary stage by transformer TR which may also provide a step-down or step-up function of DC and AC output voltages. Both primary and secondary stages of converter 4 may comprise dual switching topology with switching means Q10a-Q10b and Q20a-Q20b respectively. It would be apparent to one skilled in the art that any other topology of switching means, such as a full bridge (four-way) switching assembly in the primary stage and a half bridge (two-way) switching assembly in the secondary stage, or the like may be used.

Figure 2A:
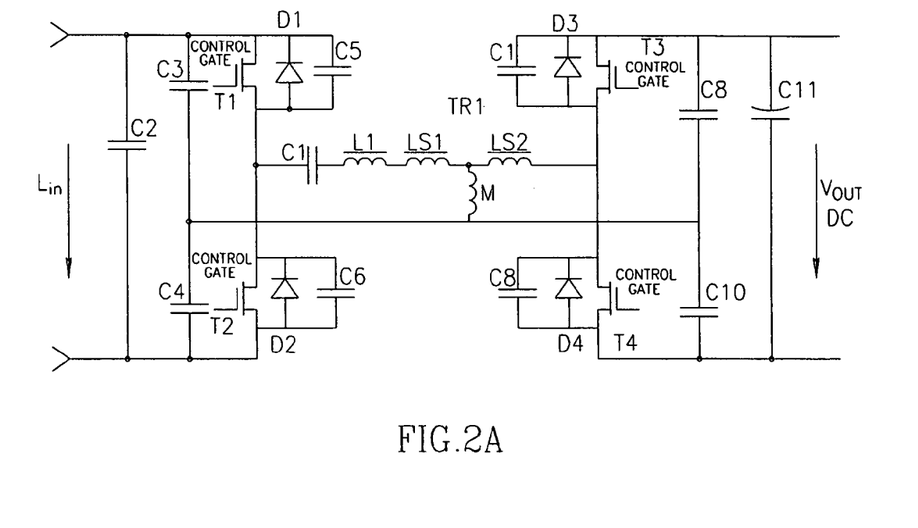
FIG. 2A is a schematic illustration of a two stage embodiment of a converter according to some embodiments of FIG. 1.

Attention is made now to FIG. 2A which is a schematic illustration of a two stage DC-DC converter 6 according to some embodiments of the invention. FIG. 2A illustrates an embodiment implementing two power stages. In this circuit, each of the two stages comprises a half-bridge converter, yet it would be appreciated by a person of ordinary skill in the art that a full-bridge converter may similarly be used. Primary stage may comprise switching transistors T1, T2; fast-recovery diodes D1, D2; filtering capacitor C2; auxiliary capacitors C3, C4 and parasitic or implemented capacitors C5, C6. The secondary stage may substantially be a mirror picture of the primary stage: switching transistor T3, T4, diodes D3 and D4, parasitic or implemented capacitors C7 and C8; auxiliary capacitors C9, C10 and filtering capacitor C11. The two stages may be coupled through transformer TR1 which may comprise magnetizing inductance represented by inductor M and leakage inductances represented by inductors Ls1, Ls2; resonant inductance L1 and resonant capacitor C1.

Figure 2B:
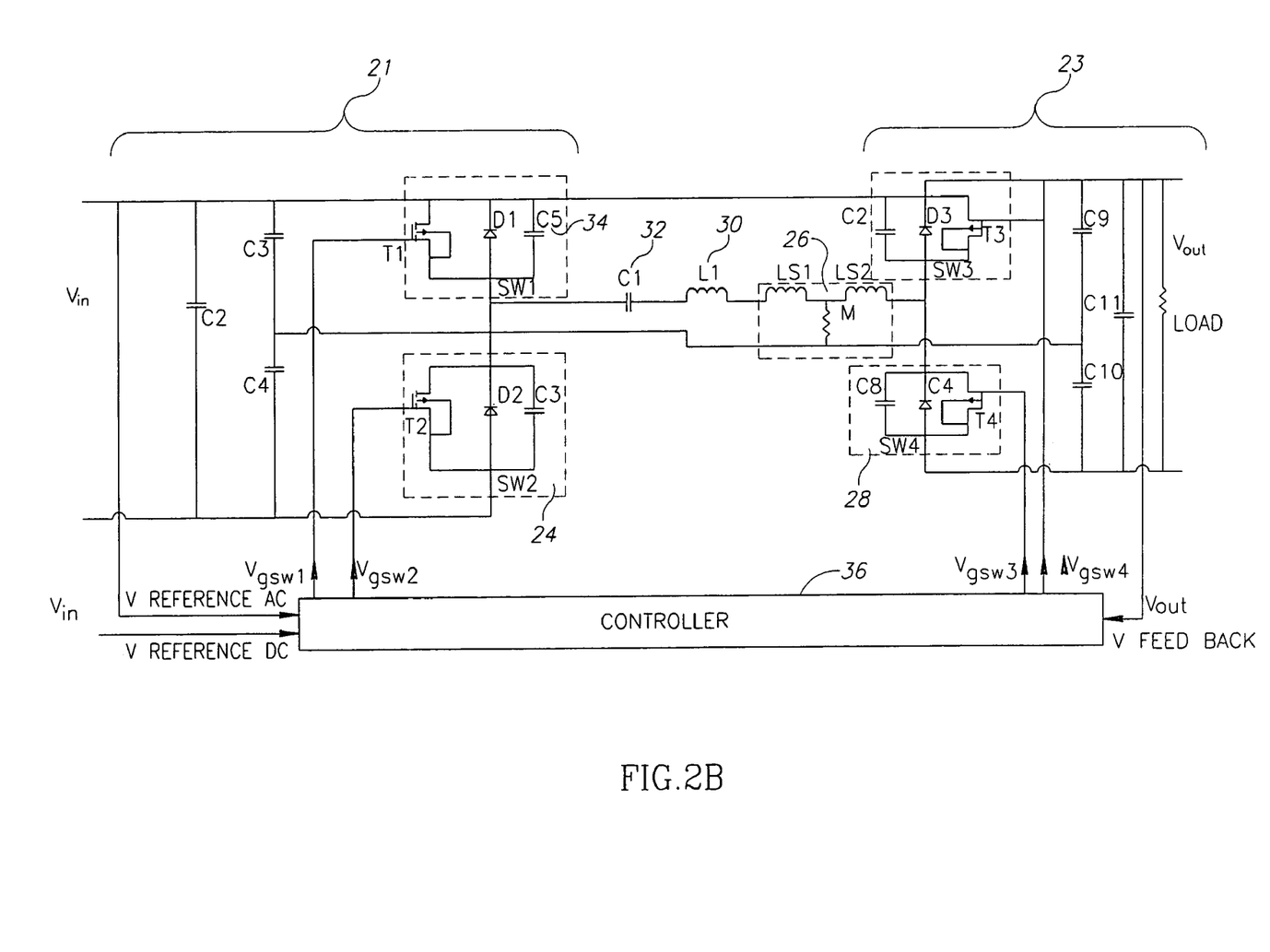
FIG. 2B is a schematic illustration of a converter with control unit according to some embodiments of the present invention

Attention is made now further to FIG. 2B, which is a schematic illustration of a converter 20 according to some embodiments of the present invention. Converter 20 may comprise two stages 21, 23 coupled by coupling means such as a transformer 30, resonant circuitry which may comprise resonant capacitor C1 and resonant inductor L1 and a controller 36. Input stage 21 may comprise input terminals for receiving input power having voltage Vin, filtering capacitor C2, auxiliary capacitors C3, C4 and switching assemblies 22 and 24, each may comprise switching means, fast recovery diode and parasitic/implemented capacitance. Output stage 23 may comprise switching assemblies 26, 28 each of which may comprise switching means, fast recovery diode and parasitic/implemented capacitance, auxiliary capacitors C9 and C10 and filtering capacitor C11. The output voltage Vout develops on output terminals of secondary stage 23. Primary stage 21 and secondary stage 23 may be coupled by a coupling transformer 30 which may comprise magnetizing inductance represented by inductor M and leakage inductances represented by inductors Ls1, Ls2; resonant inductance 32 and resonant capacitor 34. Switching assemblies 22, 24, 26 and 28 may be controlled by controller 36 which may be adapted to provide control signals to the control terminals of switching assemblies 22, 24, 26 and 28 according to any desired switching scheme. Controller 36 may further receive $V_{REF\_AC}$ representing actual voltage on the input terminals of converter 20; $V_{REF\_DC}$ to provide reference for the desired DC voltage and $V_{FB\_OUT}$ to provide feedback for the operation of converter 20 by providing voltage from the output terminals of converter 20.

Attention is made now to FIGS. 3A-3F which are partial schematic illustrations of a converter 10 according to embodiments of the present invention with indications of the current flow in branches of the converter in various steps of the working cycle. Attention is also made to FIG. 3A1 which depicts in more details optional topology and components comprised in switching assembly 11. Switching assembly 11 may be regarded as a generic topology of a switching means SWx (where x may have the values 1, 2, 3, or 4). Generic switching assembly 11 may comprise of transistor Tswx connected in parallel to diode Dswx and to capacitor Cswx. In the circuits discussed herein below, a switching means will be referred to as a switching assembly of the generic type discussed above, yet it would be apparent to a person skilled in the art that switching assembly SWx may be any other appropriate device and circuitry. The control terminal denoted VgSWx is the control terminal through which switching assembly SWx may be turned (or gated) ON or OFF by a control circuitry 36 (FIG. 2B). FIGS. 3A-3F are shown without a control unit, such as controller 36 of FIG. 2B, for more clarity yet it should be apparent to a person with ordinary skill in the art that a control unit, such as controller 36, may be used to control the operation of converter 10 by means of gating its switching devices SW1-SW4 ON or OFF at the desired timing, as will be described in more details below. The description relating to FIGS. 3A-3F intends mainly to describe the flow of currents in the branches of a converter in various phases of a work cycle, according to embodiments of the invention. The description of the flow of currents in a converter according to embodiments of the present invention is followed by a description of time graphs of voltages and currents in a converter according to the invention and respective control signals at the control gates of the switching devices.

Figure 3A:
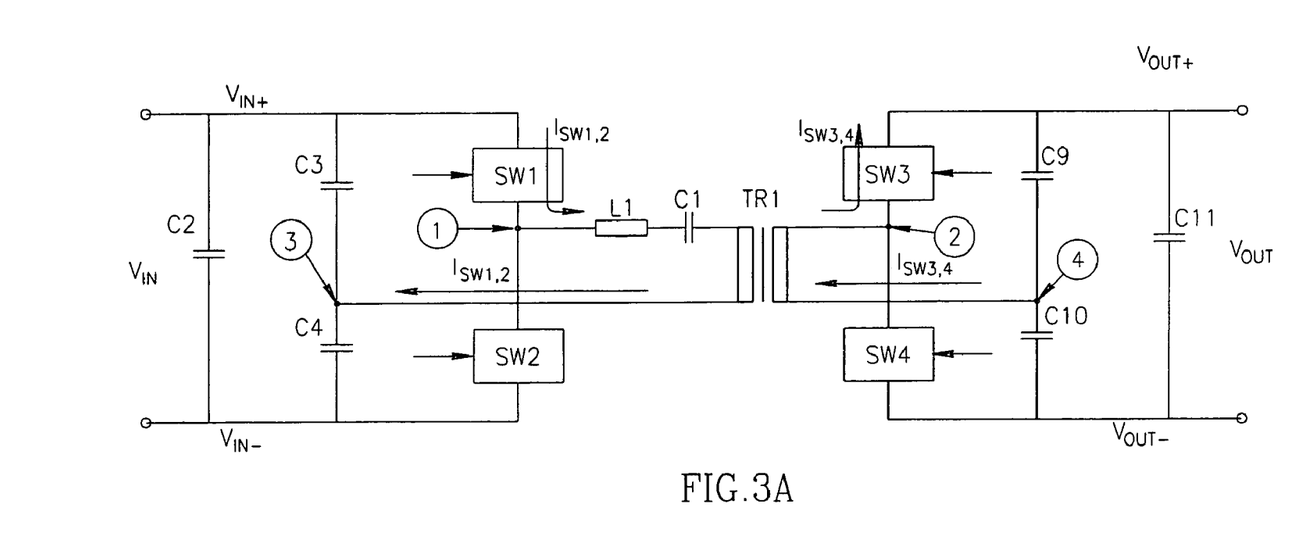
FIGS. 3A-3F, are illustrations of a converter according to the present invention and indications of current flow in branches of the converter in various steps of the working cycle.
Figure 3A:
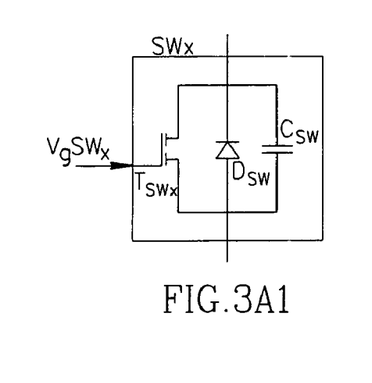
FIG. 3G is simplified equivalent scheme of a converter according to embodiments of the present invention.

As depicted in FIG. 3A (and may be applicable to converters presented in other drawings as well, with the required changes) converter 10 may comprise a first stage comprising capacitors C2, C3 and C4 and switching means SW1 and Sw2, all connected between two poles of Vin, denoted Vin+ and Vin– respectively. Switching means SW1 and Sw2 may be connected in a totem-pole arrangement with a central tap denoted "1". Similarly, converter 10 may comprise a second stage comprising switching means SW3 and SW4 and capacitors C9, C10 and C11, all connected between two poles of Vout, denoted Vout+ and Vout– respectively. Switching means SW3 and SW4 may be connected in a totem-pole arrangement with a central tap denoted "2". Further converter 10 may comprise a resonance circuit comprising inductor L1 and capacitor C1 connected between said first central tap "1" and said second central tap "2", either directly (not shown in FIG. 3A but exemplified in other drawings) or via a coupling transformer TR1. Additionally converter 10 may comprise a return path between said first and said second stages connected between point "3", being a third central tap between capacitor C3 and capacitor C4 and point "4" being a fourth central tap between capacitor C9 and capacitor C10. the return path of resonance circuit may be connected directly between points "3" and "4" (not shown in FIG. 3A but exemplified in other drawings) or via a coupling transformer TR1. It will be noted that in other embodiments of the present invention the node of capacitors C3 and C4, as well as the node of C9 and C10 may be replaced by an additional arrangement of two switching means arranged in totem-pole arrangement with their central tap at point "3" or "4" respectively, such as in a converter occupying a full-bridge at each stage.

When switching assemblies SW1 and SW3 are conducting (that is are switched ON), switching assemblies SW2 and SW4 are gated OFF; capacitor $C_{SW1}$ of switching assembly SW1 is charged to 0 volts, capacitor $C_{SW2}$ of switching assembly SW2 is charged to Vin, capacitor $C_{SW3}$ of switching assembly SW3 is charged to 0 volts, and capacitor C10 to Vout. Resonant inductor L1 and leakage inductances Ls1, Ls2, magnetized by currents $Isw_{1,2}$ and $Isw_{3,4}$ are flowing from Vin to Vout (the description of currents $Isw_{1,2}$ and $Isw_{3,4}$ as flowing 'through' transformer TR1 is a common way of describing a simplified transformer coupled circuitry, specifically if the transformation ratio is 1:1).

Figure 3B:
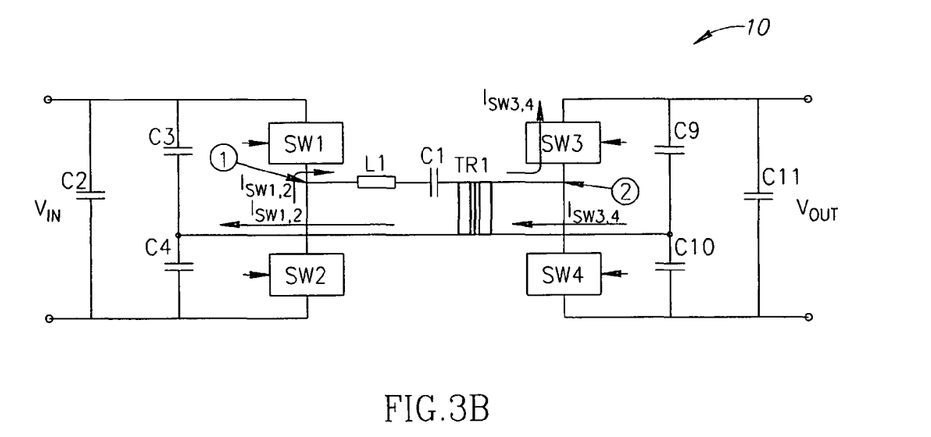

FIG. 3B shows the next step in the sequence of four steps of the presently described embodiment. After the switching assembly SW1 is gated OFF by control signal $V_{GSW1}$, current $I_{SW1,2}$ begins to charge capacitors $C_{SW1}$ and $C_{SW2}$. Because the initial voltage on capacitor $C_{SW1}$ is substantially zero, the mode of the switching is substantially ZVS, because the switching of switching assembly SW1 is done when the voltage across its terminals is substantially zero. Because the shape of the current $I_{SW1,2}$ is sine, and the value of the current is minimum (efficient for recharge of capacitors $C_{SW1}$, $C_{SW2}$), the implemented mode might be named ZVS.

Figure 3C:
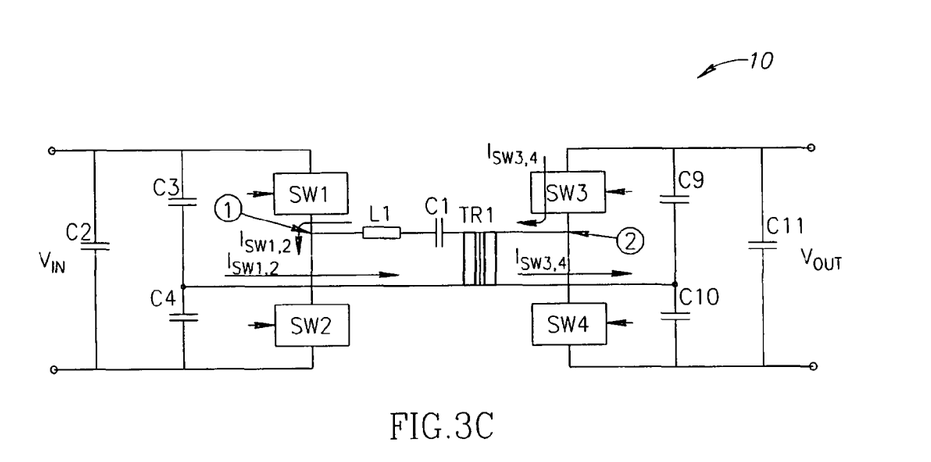
Figure 3D:
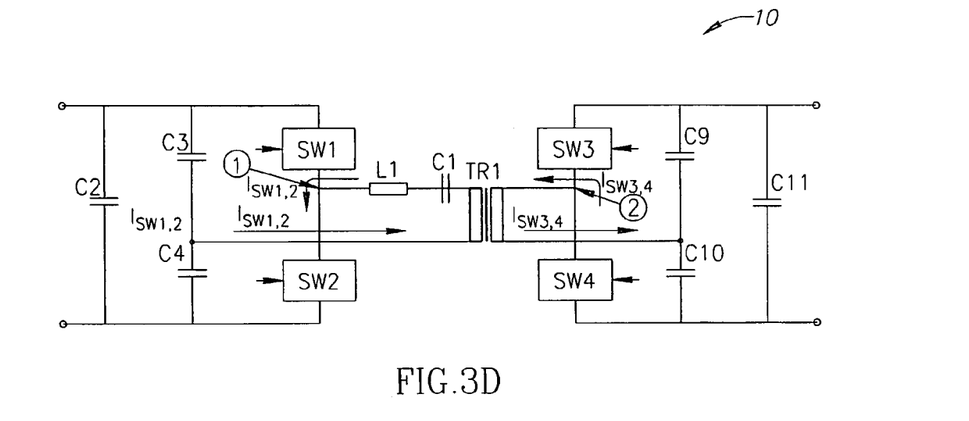

The recharge of the respective capacitors Csw1 and Csw2 forms the roll-off of voltage in point 1 (see FIG. 3A). At the end of that recharge step the voltage at point 1 (in FIG. 3A), and in accordance also the current through the diode turns diode $D_{SW2}$ ON. The transition time of change of voltage across SW1 is the time between $t_2$ and $t_3$ (see FIGS. 4A-5D). Only after that, at time $t_4$, control signal $V_{GSW2}$ is applied to SW2 to turn the switching assembly ON. The currents are described in FIG. 3B. At this time the changes in voltage has finished FIG. 3C shows a next step in the sequence of operation of converter 10 according some embodiments of the invention. After current $I_{SW1,2}$ changed its direction in the current loop of the first stage of converter 10 (see $t_5$, FIG. 4A) the direction of current $I_{SW3,4}$ in the current loop of the second stage is also changed (see $t_5$, FIG. 4C). Only after that control signal $V_{GSW3}$ is applied to switching assembly SW3 and by that it will turn the switching means OFF and current $I_{SW3,4}$ will start recharging capacitors $C_{SW3}$, $C_{SW4}$. See $t_6$ in FIG. 5C. Because the initial voltage on capacitor $C_{SW3}$ is now substantially zero, the switching mode is substantially purely ZVS. Because the value of current $I_{SW3,4}$ is minimum (enough for efficient recharging of capacitors $C_{SW3}$, $C_{SW4}$), the implemented mode is substantially ZCS. The recharge of the respective capacitors $C_{SW3}$ and $C_{SW4}$ is forming the roll-off of voltage in point 2. The corresponding time points are $t_6$ and $t_7$ respectively. The end of the recharge cycle turns diode D4 ON. Only after that, at time $t_8$, control signal $V_{GSW4}$ is applied to transistor SW4 to turn it ON. The time of this recharge cycle, $t_6$-$t_7$, is a transition time. The currents of this step are as depicted in FIG. 3D. By the end of this time the change in all voltages in this cycle fraction has finished. A signal that is applied to $V_{GSW2}$ turns assembly SW2 now to OFF (at $t_9$). Current $I_{SW1,2}$ begins to recharge capacitors $C_{SW1}$, $C_{SW2}$. Because initial voltage of capacitor $C_{SW2}$ is substantially zero, and the current $I_{SW1,2}$ charges $C_{sw1}$ and $C_{sw2}$ according to the slope of $V_{SW1-2}$ between $t_9$ to $t_{10}$. The implemented mode of this switching is substantially ZVS. Because the shape of the current as function of time is substantially a sine and is approaching crossing zero but not exactly zero—which is important to support charging of the capacitors, the mode of switching is substantially ZCS.

Figure 3E:
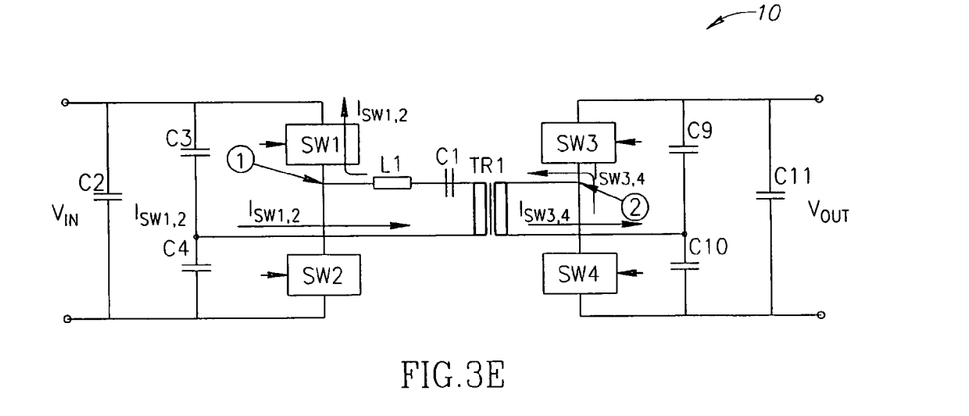
Figure 3F:
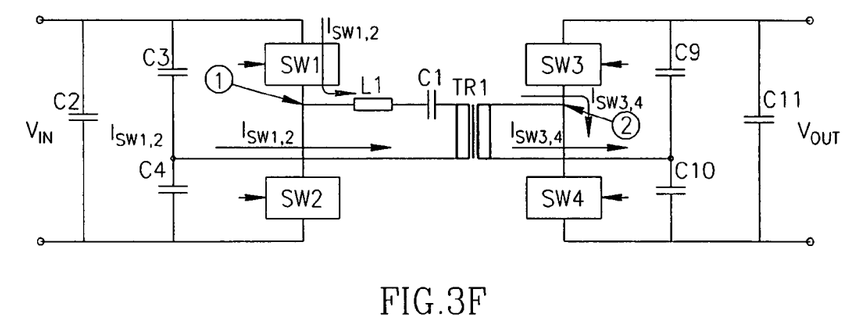

The recharge process forms the roll-off of voltage in point 1, as shown in FIG. 3E. When diode $D_{SW1}$ is turned ON it indicates the end of the recharge stage of $C_{SW1}$. Only after that signal $V_{GSW1}$ is applied to switching assembly SW1 to turn it ON. The time of this recharge is a transition time lasting between $t_9$ to $t_{10}$. By the end of this time the voltage changing in point 1 has finished. In accordance with the change of direction of the voltage applied to inductance L1 the direction of currents $I_{SW1,2}$ and $I_{SW3,4}$ alternates respectively as indicated in FIG. 3F. Switching off transistor SW4, at time t13, initiates recharge process of capacitors $C_{SW3}$, $C_{SW4}$.

At time t13 SW4 is switched off and in accordance with the direction of current $I_{SW3,4}$, recharges Csw3 and Csw4 until Vsw 3-4 reaches, during transition time, maximum voltage between t13 to t14. The switching conditions are ZVS and ZCS, similarly to the previous stages. Substantially with the conditions satisfying ZVC and ZCS at SW4. The recharge time of the capacitors is a transition time and it finishes when diode $D_{SW3}$ is turned ON (see $t_{14}$, FIGS. 4A-5D). After it, by means of control signal $V_{GSW3}$ switching assembly SW3 is turned ON, at time t15. at the end of this stage the circuit is ready to arrive at the initial state, as described above, at the end of the cycle.

As may be clearly seen above, all changes in the direction of currents $I_{SW1,2}$, $I_{SW3,4}$ are followed by the value and the polarity of voltages applied to inductor L1 and whole resonant tank—L1 and C1. All the transition times relate to the values of $I_{SW1,2}$, $I_{SW3,4}$ and values of capacitors $C_{SW1}$, $C_{SW2}$, $C_{SW3}$, $C_{SW4}$ that include the parasitic capacitors of the transistors, and optionally also the auxiliary capacitors.

Figure 3G:
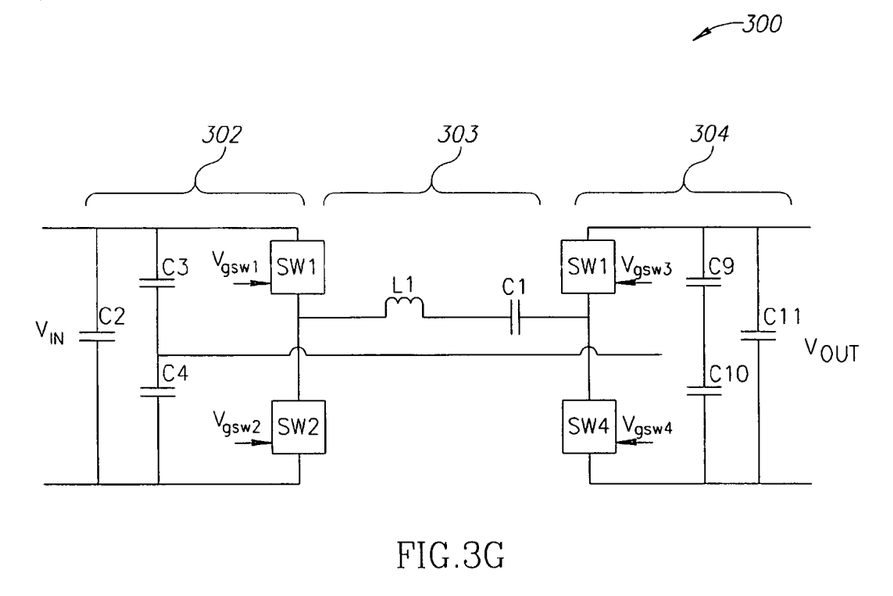

Attention is made now to FIG. 3G, which is a simplified equivalent scheme 300 of a converter according to embodiments of the present invention. Equivalent scheme 300 may faithfully represent a two-stage converter according to the present invention under several reasonable assumptions. In an ideal transformer the leakage inductance (which is represented in FIGS. 2A and 2B, for example, by LS1 and LS2) is equal substantially to zero. Therefore the coils representing the leakage inductances may be removed in this scheme. Assuming that the transfer ratio of the transformer is 1:1 then the voltage at the terminals of the primary stage of the transformer is equal to that on the terminals of the secondary stage and same applies to currents in the primary and secondary windings. Therefore the transformer may be removed completely from equivalent scheme 300. Thus, input stage 302 may be connected, under these assumptions to output stage 304 directly by Li—Cl resonant tank. As seen in FIG. 3G input stage 302 may comprise a set of switching assemblies SW1, SW2 and output stage 304 may comprise a set of switching assemblies SW3, SW4. SW1-SW4 may be controlled (i.e. gated) ON or OFF via their respective control terminals Vgsw1-Vgsw4 respectively by applying control signals from, for example, controller 36. Equivalent scheme 300 may be used for simplified analysis of the operation of a converter operating in accordance with embodiments of the present invention. Based on equivalent scheme 300 it will be apparent that the currents in the input stage 302 and in the output stage 304 are the same.

Figures 4A, 4B:
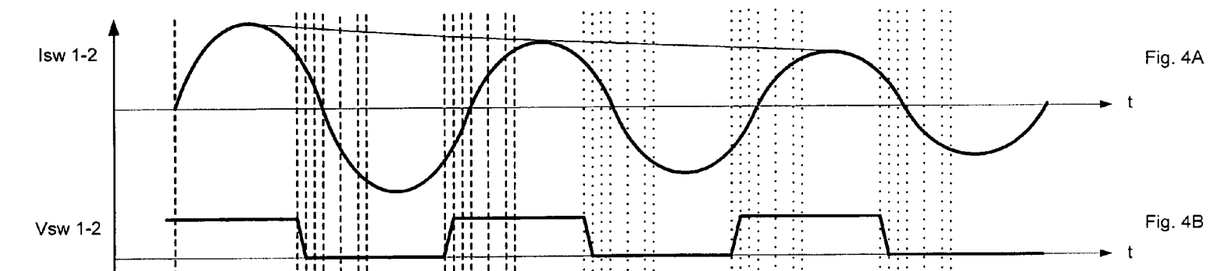
FIGS. 4A-4D are simplified illustrations of wave forms in the time-domain of current through and voltage across switching devices at both sides of a converter according to some embodiments of the present invention.
Figures 4C, 4D:
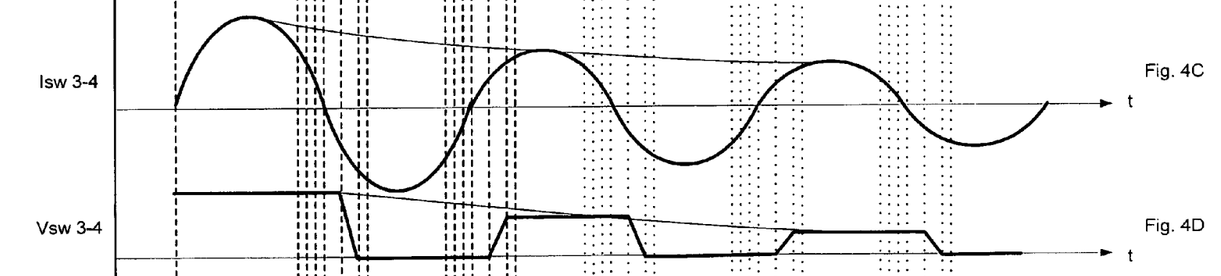
Figure 5A:
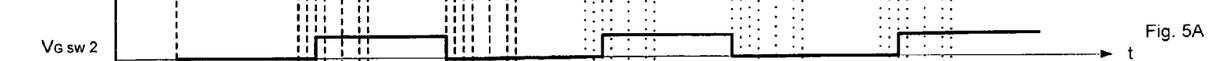
FIGS. 5A-5D are simplified illustrations of switching timing diagrams of control signals at the gate terminals of switching devices of a converter according to some embodiments of the present invention.
Figures 5B, 5C:
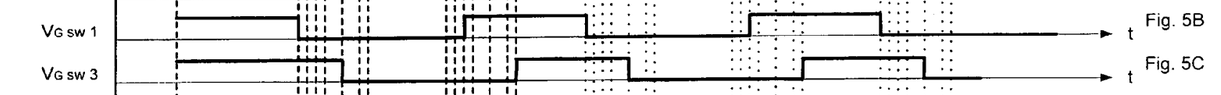
Figure 5D:
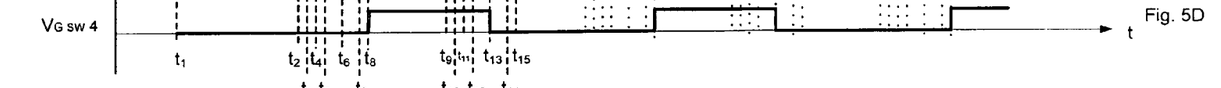

From equivalent scheme 300 of FIG. 3G it is evident that the current of input stage 302 (or $I_{SW1,2}$) which is presented in FIG. 4A is equal to the current of the output stage 304 (or $I_{SW3,4}$) which is presented in FIG. 4C.

Attention is made now also to FIGS. 4A-4D and 5A-5D which are wave forms in the time-domain of current through and voltage across switching devices at both sides of a converter and simplified illustrations of switching timing diagrams of control signals at the gate terminals of switching devices of a converter, according to some embodiments of the present invention. Substantially when transistors SW1 and SW3 are conducting (that is are switched ON), transistors SW2 and SW4 are gated OFF. Capacitor Csw1 of transistor SW1 is then charged to 0 volts, and capacitor Csw2 to Vin. Capacitor Csw3 is charged to 0 volts, and capacitor Csw4 to Vout. Resonant inductor L1 and leakage inductances Ls1, Ls2 are then magnetized by currents Isw1-2 and Isw3-4 which are flowing from Vin terminals to Vout terminals and then back from Vout terminals to Vin terminals. The switching scheme described above begins at time $t_2$ in FIGS. 4A-4D and 5A-5D.

FIGS. 4B and 4D present the voltages $V_{SW1,2}$ at point 1 and $V_{SW3,4}$ at point 2. The switching timing schemes of $V_{GSW1}$-$V_{GSW4}$ are presented in FIGS. 5A to 5D. The switching is done in roll-off mode signals and not in roll-on mode signals. With respect to the momentarily values of $I_{SW1,2}$ and $I_{SW3,4}$ (FIGS. 4A and 4C respectively) the switching schemes of FIGS. 5A to 5D present the switching ON or OFF of $V_{GSW1}$-$V_{GSW4}$ in each step of the various steps described above with respect to FIGS. 3A-3F.

$t_1$—switching assembly SW1 is turned ON (FIG. 3B). The transition time must be completed first.
$t_2$—switching assembly SW1 is gated OFF.
$t_3$—switching assembly SW1 and SW2 is turned OFF. The transition time is t2-t3 must be completed.
$t_4$—switching assembly SW2 is gated ON.
$t_5$—switching assembly SW2 is turned ON. The current Isw3-4 changes polarity.
$t_6$—switching assembly SW3 is gated OFF.
$t_7$—switching assembly SW3 is turned OFF.
$t_8$—SW4 is turned ON.
$t_9$—switching assembly SW2 is turned OFF
$t_{10}$—switching assembly SW2 is turned ON As shown in FIG. 4A to FIG. 5D, the amplitudes of the resonant tank comprising inductance L1 and capacitance C1, currents $I_{SW1,2,3,4}$ and the value of output voltage Vout may vary according to the variation of frequency/time of the cycle period. This is one of the embodiments for regulation of the values of the currents $I_{SW1,2,3,4}$ and the voltage Vout. It should be noted that graphs of FIGS. 4A-5D reflect the values related to the chosen phase difference between the voltages of the input (primary) stage, i.e. $V_{SW1,2}$ and the output (secondary) stage, i.e., $V_{SW3,4}$. The time between $t_2$ to $t_6$. is the phase shift δ. Related to the period (T). the phase is δ/T.

Figure 6:
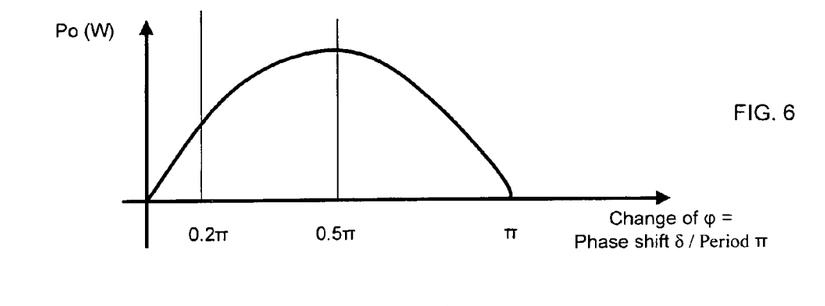
FIG. 6 illustrates a diagram of output power versus the phase shift of the secondary stage of a converter with respect to its primary stage, according to some embodiments of the present invention.
Figure 7:
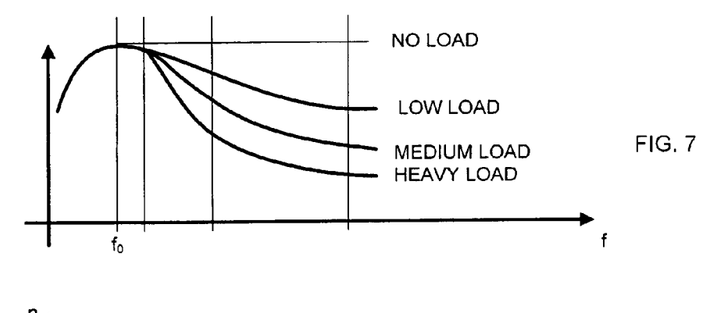
FIG. 7 illustrates a diagram of output power (Gain) versus the frequency and load.
Figure 8:
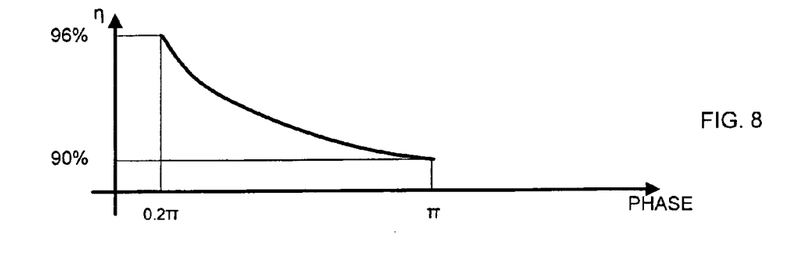
FIG. 8 illustrates a diagram of efficiency versus the phase according to some embodiments of the invention.

Attention is made now to FIGS. 6, 7 and 8, which are a diagram of output power versus the phase of the secondary stage of a converter with respect to its primary; a diagram of output power (Gain) versus the frequency and load and a diagram of efficiency versus the phase according to some embodiments of the invention. As shown in FIG. 6, the variation of the phase may impose variations of the output voltage Vout, of the output power Pout and the currents $I_{SW1,2}$ and $I_{SW3,4}$. The dynamic range of change of phase from zero to π may be divided to three main sub-regions, denoted I, II and III in FIG. 6. From a phase value of substantially zero to phase of approximately 0.2π (sub-region I) no control of Pout by means of phase shift changes is done. From phase value of 0.2π to 0.5π (sub-region II) the value of Pout and Vout increase to a maximum, and then, in sub-region III, decrease to substantially zero when the phase value reaches π. Sub-region I is practically not an operational range of control by phase change because only in phase values above 0.2π does soft-switching begins to be effective. Yet, the range of phase above 0.2π is preferable for exercising some embodiments of the invention. The cause is that higher efficiency is achieved at this range (from approximately 96% at 0.2π to approximately 90% at π), as shown in FIG. 8. Thus it would be clear that the regulation of a converter circuit according to the present invention by means of controlling the phase has to be featured substantially from phase value of 0.2π to π. This is another embodiment for regulation of the converter parameters.

The operational frequency range for a converter of the present invention may also be divided to three sub-regions. First frequency sub-region, denoted I in FIG. 7 extends substantially from $f_0$ to $f_{min}$, where $f_0$ is the natural resonance frequency of the resonant tank of a converter according to the present invention and $f_{min}$ is the frequency at which for a given load of the converter the phase is approx. 0.2π when control signals of the primary and secondary stages of the converter are in-phase of the resonant tank and the reactive current is just large enough to enable soft switching. Second frequency sub-region, denoted II, extends substantially from $f_{min}$, to $f_1$ where $f_1$ is the frequency at which for a given load of the converter the phase is approx. $0.5\pi$ when control signals of the primary and secondary stages of the converter are in-phase of the resonant tank. A third frequency sub-region, denoted III, extends substantially from $f_1$ to $f_2$ where $f_2$ is the maximum available frequency at which soft switching is still possible for a given converter circuitry. This frequency highly depends on the switching rate of the switching assemblies of the converter. It should be noted that in a preferred embodiment the control of the phase in a converter of the present invention when in sub-region II is achieved by means of change of the frequency of the converter which imposes change of the phase as a result of the change of the reaction of the secondary stage of the converter to the operation of the resonant tank. When operating in phase sub-region III the control of the phase is achieved by means of change of the phase directly by means of control of the switching ON or OFF of the switching assemblies of the secondary stage of the converter relative to the switching of the primary stage of the converter.

When planning a control scheme for a converter according to the present invention it should be noted that working in sub-regions II and III of phase, that is from phase of $0.2\pi$ to $0.5\pi$ and from $0.5\pi$ to $\pi$ respectively, imposes requirements on the regulation of a converter of the present invention that may be contradicting. A reason for that is that one-sided variation of the phase (i.e.—changing the phase of the secondary stage of a converter with respect to the primary stage) results two-sided variation of Vout. This drawback may easily be compensated by simultaneous variations of the frequency at a first range of the frequency, from frequency $f_{min}$ to $f_1$ (see FIG. 7), where the value of $f_{min}$ depends on the actual load of the converter and the required efficiency and wherein at $f_{min}$ Vout and Pout are substantially at maximum. In the frequency range of $f_{min}$ to $f_1$ the controller may issue control signals so as to keep the value of phase at substantially $0.2\pi$ and regulate Pout and Vout only by means of changing the frequency. The goal of this process is to operate the converter, as much as possible, in one-sided regulation mode and achieve high efficiency. In a second range of phase values, where the frequency equals $f_1$ and higher, when the phase between the voltage and current of the resonant tank exceeds $0.5\pi$ the system of the present invention performs the variation of phase by means of the control signals. In this range the regulation is one-sided, which enables to regulate the output of the converter either by control of the phase or by control of the frequency or by both. The latter is better because simultaneous regulation (i.e. by control of both the phase and the frequency) may increase the efficiency when at low or non load and at high input voltage, or when output voltage is very low.

Control scheme of a converter built and operating according to embodiments of the present invention may be presented with respect a two-dimensional space of working conditions of the converter, having the phase angle as one axis and the frequency as its other axis. When applying the division of the phase axis into the three sub-regions detailed above and the frequency axis divided into its three sub-regions also detailed above that two-dimensional space is partitioned into nine regions, which may be denoted, for example, region $f_I\text{-}p_{II}$, which defines the region where the frequency of the converter is in its I sub-region and the phase is in its II sub-region. Based on this notation method it is now possible to define the required working conditions of a converter according to the present invention by denoting the value of each of the variables frequency (denoted "f" in Table 1) and phase (denoted "p" in Table 1) expressed by a sub-region identifier.

TABLE 1

| | | p | |
|---|---|---|---|
| f | Sub-region I | Sub-region II | Sub-region III |
| Sub-region I | $f_I\text{-}p_I$ | $f_I\text{-}p_{II}$ | $f_I\text{-}p_{III}$ |
| Sub-region II | $f_{II}\text{-}p_I$ | $f_{II}\text{-}p_{II}$ | $f_{II}\text{-}p_{III}$ |
| Sub-region III | $f_{III}\text{-}p_I$ | $f_{III}\text{-}p_{II}$ | $f_{III}\text{-}p_{III}$ |

According to the present invention preferable regions for operation of the converter, in order to achieve, inter alia, the stated goals of high efficiency at large ranges of load variation and input voltage variations are regions $f_{II}\text{-}p_{II}$ and $f_{III}\text{-}p_{III}$. Operating the converter of the present invention in these regions will also ensure stability of the working parameters. It will be noted that the control of the working conditions of a given converter circuitry having a given resonance frequency may fully be controlled by, for example, controller 36 of FIG. 2B merely by applying a desired switching scheme to switching assemblies for example, switching assemblies 22, 24, 26 and 28 (FIG. 2B). Control of the frequency may be achieved by changing the switching rate of all four switching assemblies 22, 24, 26 and 28 substantially in the same extent. Control of the phase of the converter of the present invention may be achieved by changing the switching timing scheme of switching assemblies 26 and 28 of the secondary stage of the converter 20 with respect to the timing of switching assemblies 22 and 24 of the primary stage of the converter. As much as the switching scheme of the secondary stage is delayed with respect to that of the primary stage the phase angle grows.

The ability of a converter built and operating according to the present invention to convert AC input voltage into the desired value of DC output voltage. Additional advantage feature of the converter is to use available DC power at the output terminals and convert it into AC power at, for example, a AC high frequency output terminals, as shown in FIG. 1A. When the input voltage drops down sharply the second stage may derive power from a output capacitor (for example C11 in FIG. 2) to provide AC voltage to the AC output 5 in converter 4 of FIG. 1B. It may happen when the input is supplied with AC voltage at low frequency of, for example, 50 Hz, and the output voltage AC at high frequency of up to, for example, 1 MHz. Moreover, because the power of AC output voltage in this case does not pass through the first stage of the converter, the efficiency of this embodiment may go up to 97%.

Other aspects and features of the presented invention can be obtained from study of the drawings, the disclosure, and the appended claims.

What is claimed:

1. A DC-DC converter comprising:
   a first stage, comprising
   a first controllable bridge adapted to control conduction of current to and from a first and a second poles of said converter to a first central tap using a first and a second switching means arranged in a totem-pole arrangement between said first and said second poles, the voltage between said first and said second poles is denoted Vin;

a first and a second capacitors connected in series between said first and said second poles forming a third tap between them;

a second stage, comprising a second controllable bridge adapted to control conduction of current to and from a third and a fourth poles of said converter to a second central tap using a third and a fourth switching means arranged in a totem-pole arrangement between said third and a said fourth poles, the voltage between said third and said fourth poles is denoted Vout;

a third and a fourth capacitors connected in series between said third and said fourth poles forming a fourth tap between them;

a resonance circuit having a first path connected between said first and said second taps and a second path connected between said third and said fourth taps, said resonance circuit comprising at least a resonance inductor and a resonance capacitor, said resonance circuit having a resonance frequency; and a control unit adapted to switch ON and OFF each of said first, second, third and fourth switching means, and to receive indication of a reference voltage and of said Vin and said Vout wherein said first, said second, said third and said fourth switching means are provided with control signals to control the actual frequency of said converter and the phase shift between said first stage and said second stage, said control signals being provided so as to maintain the frequency of said first stage and of said second stage within a first operational region ranging substantially from frequency $f_{min}$ to frequency $f_1$ or within a second operational region ranging substantially from said frequency $f_1$ to frequency $f_2$;

wherein $f_{min}$ is the frequency at which for a given load of said converter the phase is substantially $0.2\pi$ when control signals of said primary and said secondary stages are in-phase with said resonance circuit and the reactive portion the current through said switching means is just large enough to enable soft switching;

wherein said $f_1$ is the frequency at which for a given load of said converter said phase is substantially $0.5\pi$ when control signals of said primary stage and said secondary stage are yet in-phase with said resonance circuit; and wherein said $f_2$ is the maximum available frequency at which soft switching is still possible for said converter and control signals of said primary stage and said secondary stage are in phase difference of substantially $\pi$.

2. A method of controlling a DC-DC converter, said converter comprising a first stage comprising a first controllable bridge adapted to control conduction of current to and from a first and a second poles of said converter to a first central tap using a first and a second switching means arranged in a totem-pole arrangement between said first and said second poles, the voltage between said first and said second poles is denoted Vin; a first and a second capacitors connected in series between said first and said second poles forming a third tap between them; a second stage, comprising a second controllable bridge adapted to control conduction of current to and from a third and a fourth poles of said converter to a second central tap using a third and a fourth switching means arranged in a totem-pole arrangement between said third and a said fourth poles, the voltage between said third and said fourth poles is denoted Vout; a third and a fourth capacitors connected in series between said third and said fourth poles forming a fourth tap between them; a resonance circuit having a first path connected between said first and said second taps and a second path connected between said third and said fourth taps, said resonance circuit comprising at least a resonance inductor and a resonance capacitor, said resonance circuit having a resonance frequency; and a control unit adapted to switch ON and OFF each of said first, second, third and fourth switching means, and to receive indication of a reference voltage and of said Vin and said Vout, the method comprising:

providing control signals to said first, said second, said third and said fourth switching means to control the actual frequency of said converter and the phase shift between said first stage and said second stage;

wherein said control signals are provided so as to maintain the frequency of said first stage and of said second stage within a first operational region ranging substantially from frequency $f_{min}$ to frequency $f_1$ or within a second operational region ranging substantially from said frequency $f_1$ to frequency $f_2$;

wherein $f_{min}$ is the frequency at which for a given load of said converter the phase is substantially $0.2\pi$ when control signals of said primary and said secondary stages are in-phase with said resonance circuit and the reactive portion the current through said switching means is just large enough to enable soft switching;

wherein said $f_1$ is the frequency at which for a given load of said converter said phase is substantially $0.5\pi$ when control signals of said primary stage and said secondary stage are yet in-phase with said resonance circuit; and wherein said $f_2$ is the maximum available frequency at which soft switching is still possible for said converter and control signals of said primary stage and said secondary stage are in phase difference of substantially $\pi$.

3. The method of claim 2 wherein said control signals are responsive to changes in said Vin, Vout and said reference voltage.

4. The method of claim 3 wherein said control signals are responsive also to the actual load connected to said Vout terminals.

5. The method of claim 4 wherein said control signals are provided so as to maintain the phase between said first stage and said second stage within a first operational region ranging from $0.2\pi$ to $0.5\pi$ or within a second operational region ranging from $0.5\pi$ to $\pi$.

6. The method of claim 2, wherein said converter is operated only in said first operational region of phase ranging from $0.2\pi$ to $0.5\pi$.

7. The method of claim 6, wherein said converter is operated only in said second operational region of frequency ranging from frequency $f_1$ to frequency $f_2$ to achieve efficiency of said converter not less than 92%-94%.

* * * * *